Patented June 12, 1951

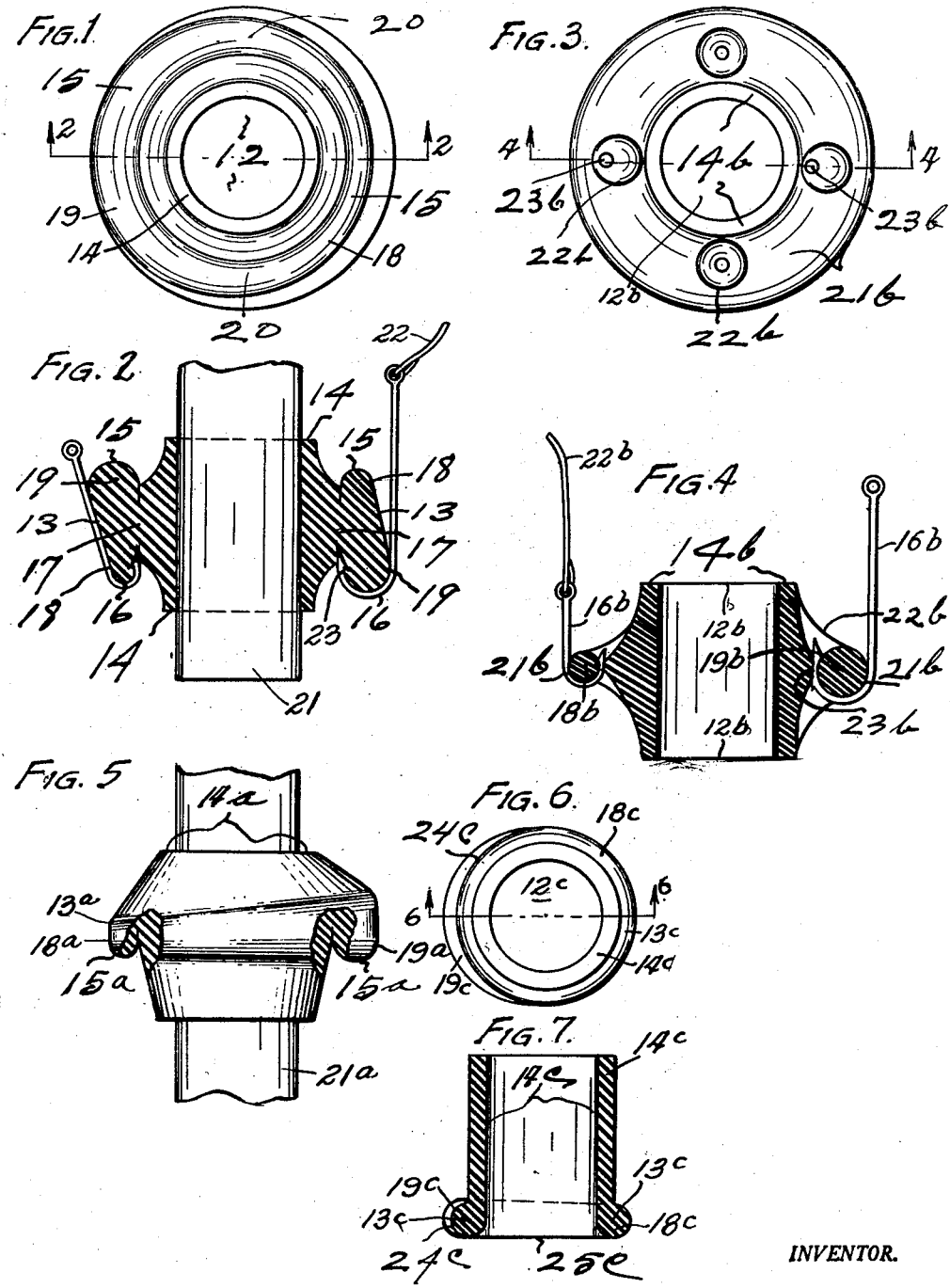

2,556,403

UNITED STATES PATENT OFFICE 2,556,403

FISHING POLE ACCESSORY

Edward Sokolik, New Brighton, Minn.

Application August 22, 1946, Serial No. 692,248

5 Claims. (Cl. 43—25.2)

This invention relates to an accessory for the handle end-portion of a fishing pole.

Principal object is to provide an anchor adapted for various sizes of fishing hooks, to anchor and harbor the points thereof, to grip the pole, and is slidably adjustable upon the pole to the length of the line, which normally is shorter than the pole, and maintains a constant tension of desired intensity, on the line.

Another object is that the same accessory while holding a line under constant tension and desired intensity, affords a means whereby the pole may be tied to a vehicle for transportation, without scratching same and without rattling or shifting on the vehicle. The accessory serves as a resilient padding between the pole and vehicle.

A further object is that the same accessory affords a positive grip of the pole when biting fish are jerking on the pole.

This invention further resides in the combination of elastic material and construction and arrangement of certain features whereby the above and other objects and advantages are attained, as will be apparent as the specification proceeds.

In the accompanying drawings, like numerals designate like or corresponding parts in the several views, and in which:

Figs. 1 and 2 illustrate one species of the invention. Fig. 2 is a vertical section taken along the line 2—2 of Fig. 1 and Fig. 1 a plan view;

Figs. 3 and 4 illustrate another species of the invention. Fig. 4 is a vertical section taken along the line 4—4 of Fig. 3 and Fig. 3 is a plan view;

Fig. 5 illustrates a non-reversible species of the invention and is an elevation with portions thereof in section; and Figs. 6 and 7 illustrate still another species of the invention. Fig. 6 is a plan view and Fig. 7 a vertical section taken along the line 6—6 of Fig. 6.

Figs. 1 and 2 illustrate a species, which is made normally of elastic material and reversible end for end, comprising a ring 13 encircling intermediately and connected, by the annular neck 17, to the ferrule 14, which has preferably both ends 12 open to be adapted elastically to grip the fishing pole 21 and to be slideably adjustable on the same according to the length of the fishing line 22, which normally is shorter than the fishing pole 21 and further shortened by shrinking when soaked in water or broken and reconnected. The ring 13 is wider in proportion to the thickness thereof and has a rounded rim 15 on each end thereof. Each rim 15 is of varying diameter horizontally to be adapted to receive therearound the rounded portions of various sizes of fishing hooks 16, simultaneously sheltering the points thereof between the rim 13 and the ferrule 14 of the accessory. The barbs 23 of the fishing hooks 16 anchor in the inner side of the rim 15 of the ring 13, thereby attaching the fishing hooks 16 to said inner side of the rim 15, from which the hooks 16 may be readily manually, but not automatically detached, without mutilating said inner side of the rim 15 by the barbs 23 Each rim 15 has a point 18 of minimum horizontal diameter and an opposite point 19 of maximum horizontal diameter. The minimum and maximum points 18 and 19 of each rim 15 are arranged preferably to oppose those of each other rim 15, thereby imparting symmetry to the accessory. The medial points 20 of each rim 15 correspond in horizontal diameter forming vertically parallel faces on the ring 13, whereas the point 18 of one rim 15 and the point 19 of the other rim 15, may have faces vertically or obliquely parallel.

Figs. 3 and 4 illustrate a species similar to the preceding specie. It, too, is reversible. The reference numerals used in Figs. 3 and 4 are affixed with b and designate like or corresponding parts. In this species, the ferrule 14b has open ends 12 and is encircled by the flange 21b, which is gradually increased from minimum diameter at 18b to maximum diameter at 19b and which has a plurality of countersinks 22b on one side and opposite countersinks 22b on the other side, forming axial apertures 23b for the point of fishing hooks 16b to interlock therein. The countersinks 22b afford a harbor for the point of the hooks 16b and are graduated for various sizes of fishing hooks 16b.

The rest is the same as Figs. 1 and 2.

Fig. 5 illustrates a species corresponding to Figs. 1 and 2 except that the ring 13a has only one rim 15a and that it is not reversible. The reference numerals used in Fig. 5 are used and affixed with a and designate like parts. The minimum and maximum diameters of the rim 15 are indicated at 18a and 19a respectively. The edge of the ring 13a is of minimum diameter at 18a and of maximum diameter at 19a.

The rest is the same as Figs. 1 and 2.

Figs. 6 and 7 illustrate a species that is not reversible. The reference numerals used are affixed with c and designate like parts. In this species, the ring 13c is transferred to one of the edges of the ferrule 14c in the form of a bead 24c which is of graduated diameter, for various sizes of hooks applied to the edge 25c.

The rest is the same as Figs. 1 and 2.

Further modifications are possible within the scope and concept of the invention without departing from the merits of the appended claims.

What I claim is:

1. A fish hook holder accessory for a fishing pole comprising an annular member having a central opening of sufficient size so as to receive a fishing pole and an extension extending completely around the annular member and having portions of varying cross-section in transverse planes throughout their extent and having contours of such shape and size as to correspond to bills of fish hooks of various sizes.

2. An accessory as defined in claim 1, wherein said portions are on the upper and lower edges of said extension 3. An accessory as defined in claim 1, wherein said portions are on the lower edge of said extension.

4. An accessory as defined in claim 1, wherein said extension circumscribes the annular member intermediately between the ends thereof.

5. An accessory as defined in claim 1, wherein said extension circumscribes the annular member at one end-edge thereof.

EDWARD SOKOLIK.

REFERENCES CITED

The following references are of record in the file of this patent:

UNITED STATES PATENTS

| Number | Name | Date |
|---|---|---|
| 1,113,847 | Turner | Oct. 13, 1914 |
| 1,531,725 | Baker | Mar. 31, 1925 |
| 1,550,080 | Lehrritter | Aug. 18, 1925 |
| 2,144,122 | Pflueger | Jan. 17, 1939 |

FOREIGN PATENTS

| Number | Country | Date |
|---|---|---|
| 606,406 | France | June 14, 1926 |